United States Patent Office 2,709,140
Patented May 24, 1955

2,709,140

INSULATED ELECTRICAL CONDUCTOR

John C. Michalek, Niagara Falls, N. Y., assignor to Olin Mathieson Chemical Corporation, a corporation of Virginia No Drawing. Application April 23, 1947,
Serial No. 743,453

2 Claims. (Cl. 117—128.4)

My invention deals with electrical conductors and more particularly pertains to electrical conductors insulated with a novel dielectric composition having the advantages of polystyrene dielectric compositions but which, unlike such latter compositions, does not tend to soften and flow when applied as a dielectric material in electrical condensers, particularly certain condensers of the rolled or stacked type. Apart from a higher softening point, the dielectric composition of my invention improves over dielectric compositions of polystyrene in that it does not, when used in electrical condensers, tend to cause an undesirable increase in power factor or bring about undesirable chemical reactions through moisture transmission.

A composition according to my invention is characterized by comprising a polymer of 2,5-dichlorostyrene.

When I prepare my composition from individual dichlorostyrenes I prefer to employ those isomers in which the 2 chlorine atoms stand in non-adjacent or opposite relation on the benzene nucleus, e. g. 2,5-dichlorostyrene.

The copolymer prepared from a mixture of all the isomers, containing the 2,5-isomer in predominate portions, is especially advantageous. All of the nuclear dichlorostyrene polymers and copolymers I have tested show a high dielectric constant, very low electrical loss, resulting in a low power factor, a softening point above unsubstituted styrene and little tendency to act as a conduit for moisture.

My dielectric composition may consist entirely of one of the homo-polymers or copolymers or it may additionally comprise other materials as fillers, for example ground mica, hardeners, plasticizers, and the like. The particular purpose for which the composition is to be used is naturally determinative of the presence or absence of such materials. In most applications they are unnecessary.

Prepared in liquid form and containing a polymerization inhibitor preventing further polymerization, my composition may be applied with good effect as wire saturant or cable oil or impregnant. Other specific uses for the composition include coil mounting strips, insulating beads for co-axial cable, stand-off insulators, insulating rods and bushings, coil forms, etc. Coils and circuit parts treated or coated with the composition are highly resistant to moisture.

In the production of the chloro-polymers and copolymers the monomeric material subjected to polymerizing conditions may include one or more non-halogenated monomers or halogenated monomers other than those previously indicated herein and such monomers may not be from the class of polymerizable compounds referred to in the art as "styrene compounds." The material subjected to polymerizing conditions may also comprise partially polymerized monomers or substances or compounds which of themselves are not polymerizable or difficultly polymerizable. Thus, there may be included in the monomeric material, in proportions not substantially adversely affecting the dielectric qualities of the polymeric product, but in proportions adequate to impart to such product a special quality better adapting it for use in a particular application contemplated: mono-olefins, such as isobutylene, diolefins, particularly butadiene-1,3 and its derivatives, for example, methyl butadiene, unsubstituted styrene, alpha alkyl styrenes, alkyl styrenes, vinyl chloride, vinyl acetate, quinine, N-vinyl phthalamide, N-vinyl carbazole, 3-chloro-N-vinyl carbazole, N-vinyl indole, N-vinyl pyrrole, vinyl pyridine, vinylidine chloride, methylene malonic ester, methyl methacrylate, maleic esters, maleic anhydride, coumarone, indene, chloro-maleic esters, chloro-maleic anhydride, divinyl benzene, divinyl dichlorobenzene, allyl maleate, allyl crotonate, allyl acrylate, allyl methacrylate, vinyl ethers, acrylonitrile, acrylyl chloride, methyl vinyl ketone, chlorinated biphenyls, chlorinated naphthalene, and the like.

Of the foregoing, the presence in the monomeric material of unsubstituted styrene, methyl methacrylate or N-vinyl carbazole is most frequently advantageous, the resulting copolymers being characterized by unexpectedly great resistance to combustion and to heat and the reaction leading to their production being one which proceeds at a high rate relative to the reaction where the monomeric material consists entirely of one or more nuclear dichlorostyrenes. The inclusion of conventional plasticizers, such as triphenyl phosphate, tricresyl phosphate, dibutyl phthalate, and the like in the monomeric material does not appear to materially adversely effect the rate of polymerization.

Among other plasticizers which may be used in the practice of my invention may be mentioned: keto aromatic acids, such as methyl benzoylbenzoate, phthalides, substituted phthalides, ethylacetanilide, carbon tetrachloride, camphor, ethylene dichloride, sodium trichloracetate, hexachlorethane, diphenyl phthalate, glycerol, butyl stearate, diebnzyl ether, paraffin, dixylylethane, cresol, diphenylpropane, tritolyl, etc. These and the three plasticizers before named may, of course, be employed not only where the monomeric material to be subjected to polymerizing influences comprises a component other than one or more monomeric nuclear dihalo-styrenes, but also where it does not comprise such a component.

The monomeric nuclear dichlorostyrenes employed according to the invention may be prepared by a number of different methods. Thus, they may be prepared by converting dichlorbenzaldehydes to dichlorphenylmethyl carbinols with a methyl Grignard reagent, the Grignard reaction being carried out in the usual manner, and dehydrating the carbinols over activated alumina at temperatures approximating 300°–350° C. under low subatmospheric pressures. Alternatively, the nuclear dichlorostyrenes may be produced from ethyl benzene, by chlorinating this compound in the dark to attach two chlorine atoms to the ring, then chlorinating the ethyl dichlorobenzene in the light to form chloroethyl dichlorobenzene and subsequently dehydrochlorinating the chloroethyl side chain. I have stated in the forepart hereof that in the preferred embodiment of my invention the composition represents a copolymer of all six nuclear dichlorostyrenes. The monomeric mixture polymerized to produce this copolymer is most expeditiously prepared by the method last described.

Whether individual nuclear dichlorostyrenes or mixtures are employed in the preparation of the composition of the invention, best results are obtained when the monomeric material is substantially completely free of impurities. When properly prepared the isomers have a density of from $D_4^{25}=1.236$ to $D_4^{25}=1.280$ and a refractive index from $N_D^{25}=1.5724$ to $N_D^{25}=1.5838$.

Polymerization of the nuclear dichlorostyrenes proceeds at ordinary temperatures and can be accelerated by either or both pro-oxidants or elevated temperatures. The polymerization may be carried out in a sealed tube in the absence of materials other than the monomers, or the monomers may be dispersed or emulsified in a suitable solvent, normally water. Useful pro-oxidants or catalysts include hydrogen peroxide, urea peroxide, potassium persulphate, sodium perborate, and the like. Emulsifying agents which may be used, with advantage, comprises alkali metal salts of high molecular weight, alkyl sulphates, alkali metal alkyl benzenes, or alkyl naphthalene sulphonates, alkali metal sulfoethyl oleate and salts of other sulphonated esters and oils as well as the more common soaps, such as sodium or ammonium oleate or laureate. Ammonium oleate and laurate have been found to be particularly effective.

When necessary, as where the product is desired in liquid form, the polymerization may be arrested by hydrogenation.

My invention contemplates polymerization of the monomers in situ. Thus, electrical units such as condenser units may be spaced within a suitable chamber and vaporized monomeric material passed thereinto in quantities sufficient to impregnate the units which may be thereafter subjected to conditions causing polymerization of the condensed impregnant. Alternatively, or additionally, such units may be dipped or painted with a solution of resinous polymer or copolymer in a volatile solvent.

The high molecular weight polymeric materials require higher temperatures for molding, for example in the manufacture of condenser casings, but in all other respects they can be dealt with in the same manner as high molecular weight polymers of unsubstituted styrene. In a typical molding operation the resinous polymer, after comminution to pieces passing an eight mesh screen, is placed in conventional steel molds and subjected to a pressure of the order of 3,000 pounds per square inch while being maintained at a temperature approximating 140°–185° C.

Various aspects of my invention, including monomer preparation, polymerization of individual monomers and mixtures of monomers and the electrical characteristics of the polymers and copolymers are illustrated by the examples below which are not to be taken as in any way restrictive of the scope of the invention:

Example I 2,5-dichlorostyrene is charged into a closed glass vessel with 0.05% by weight of benzoyl peroxide, maintained at 20° C. for fifteen hours and then at 45°–50° C. for one hundred hours. The polymer is hard, clear, water-white and tough, and has a density of about 1.42.

Example II

Equal parts of 2,5-dichlorostyrene and 2,6-dichlorostyrene are charged into a closed glass vessel with 0.1% by weight of benzoyl peroxide and maintained at 45°–50° C. for 75 hours. The resulting copolymer is hard, clear and tough.

Example III

The same procedure with equal parts of 2,5-dichlorostyrene and 3,4-dichlorostyrene produces a similar copolymer.

Example IV

Equal parts of 2,5-dichlorostyrene and 3,4-dichlorostyrene are charged into a closed glass vessel with 15% by weight of tricresylphosphate and 0.1% of benzoyl peroxide and maintained at 45°–50° C. for 75 hours. The resulting copolymer is hard, clear and tough.

Example V

Three parts of 2,5-dichlorostyrene and one part of alpha-methyl styrene are charged into a closed glass vessel with 0.25% by weight of benzoyl peroxide and maintained at 45°–50° C. for 50 hours. The resulting copolymer is hard, clear and tough.

Example VI

A mixture of equal parts of 2,3-dichlorostyrene, 2,4-dichlorostyrene, 2,5-dichlorostyrene, 3,4-dichlorostyrene and 3,5-dichlorostyrene is charged into a closed glass vessel and heated to 65°–70° C. for 24 hours. The copolymer is solid after 4 hours of heating.

Example VII

One mol of 2,5-dichlorbenzaldehyde (melting point 56°–57° C.) in solution in dry ether is slowly added to one mol of methyl magnesium iodide in solution in dry ether and the product of this reaction is hydrolyzed with water. The ether is evaporated from the product, 2,5-dichlorophenylmethylcarbinol, which is then purified by recrystallization from benzene. The purified carbinol (melting point 61°–62° C.) is melted, vaporized and, with nitrogen as an inert carrier, is passed through a glass tube charged with 8–10 mesh activated alumina at a temperature of 300°–350° C. under a pressure of 10–12 mm. of mercury. The resulting vapors are condensed, water is separated and the product is dried over potassium carbonate and purified by distillation under a pressure of 2–4 mm. of mercury. 2,5-dichlorostyrene is obtained in good yield as a water-white liquid having a boiling point of 74°–76° C. at 3.0 mm. of mercury, a density of $D_4^{25}=1.245$ and an index of refraction of $N_D^{25}=1.5788$. This isomer can be identified by oxidation with potassium permanganate, 2,5-dichlorobenzoic acid with a melting point of 153°–154° C. being obtained.

Example VIII

Ethyl benzene was chlorinated in the presence of iron until 2 chlorine atoms were absorbed on the ring. A fraction of the resulting chlorinated material, consisting chiefly of ethyl dichlorobenzene, and boiling within the range 204°–220° C. was chlorinated in the light and the chlorinated product distilled to obtain a fraction boiling within the range 104°–106° C. at 6.5 mm. This fraction, consisting predominantly of chloroethyl dichlorobenzenes, was passed at 15 mm. pressure through a furnace containing activated alumina heated to 400°–450° C. The product from the furnace, after being condensed, was distilled to obtain a mixture of all six isomeric nuclear dichlorostyrenes, this being present in the mixture in approximately the following proportions by weight:

| | Per cent |
|---|---|
| 2,4-dichlorostyrene | 45 |
| 2,5-dichlorostyrene | 40 |
| 3,4-dichlorostyrene | 5 |
| 2,6-dichlorostyrene | 5 |
| 2,3-dichlorostyrene | 4 |
| 3,5-dichlorostyrene | 1 |

The mixture had a boiling point of 81°–83° C. at 6 mm. pressure, a density of $D_4^{25}=1.258$ and an index of refraction of $N_D^{25}=1.5790$. Placed in a test tube and kept in the light for 12 days, it polymerized to a hard, tough, clear resin, pale yellow in color.

Example IX

A copolymer prepared as above from a mixture of monomeric nuclear dichlorostyrenes was tested along with polystyrene for water absorption. At 25° C. the copolymer absorbed 0.02% (on its weight) of water as against 0.04% for polystyrene. At 43° C. the figures were .03% and .065%, respectively, at 72° C. .078% and .11% and at 100° C. .16% and .20%.

Example X

Copolymers produced from five mixtures of nuclear dichlorostyrenes, each mixture containing all of the possible isomers but in different proportions varied only slightly in the respect of dielectric constant and power factor as will be seen from the table below. Sample 6 was a homopolymer produced by the polymerization of 2,4-dichlorostyrene.

| Sample | Dist. under Heat, °C. | Side Chain Chlorine, Percent | Dielectric Constant | Power Factor |
|---|---|---|---|---|
| 1 | 105 | .012 | 2.62 | .0019 |
| 2 | 114–120 | .023 | 2.61 | .0012 |
| 3 | 115–116 | .014 | 2.60 | .0017 |
| 4 | | | 2.60 | .0010 |
| 5 | | no detectable | 2.58 | .00043 |
| 6 | 121 | 0.023 | 2.60 | .00083 |

The present application is a continuation-in-part of applicant's prior abandoned application, Serial No. 572,087, filed January 9, 1945. The latter application is a continuation-in-part of abandoned application, Serial No. 449,475, filed July 2, 1942.

I claim:

1. An electrical conductor insulated with a dielectric composition comprising a polymer of 2,5-dichlorostyrene.

2. An electrical conductor insulated with a dielectric composition comprising a polymer of a nuclear dichlorinated styrene having the chlorine atoms substituted on opposite positions in the styrene ring.

References Cited in the file of this patent
UNITED STATES PATENTS

| | | |
|---|---|---|
| 1,998,309 | Clark et al. | Apr. 16, 1935 |
| 2,019,338 | Clark | Oct. 29, 1935 |
| 2,384,535 | Craig | Sept. 11, 1945 |
| 2,398,736 | Dreisbach | Apr. 16, 1946 |
| 2,406,319 | Brooks et al. | Aug. 27, 1946 |

FOREIGN PATENTS

| | | |
|---|---|---|
| 564,828 | Great Britain | Oct. 16, 1944 |

OTHER REFERENCES

Brooks: "Preparation of Substituted Styrenes," in Journal of the American Chemical Society, vol. 66, pp. 1295–1297.

Michalek and Clark: "Dichlorostyrenes and Their Polymers," in Chemical and Engineering News, vol 22.

Jones and Brown: "A New High Temperature Styrene," in Modern Plastics, August 1944, pp. 62, 93 and 168.